(No Model.) 3 Sheets—Sheet 1.

F. W. SHELLEY & S. KISER.
BRICK MACHINE.

No. 291,413. Patented Jan. 1, 1884.

ATTEST.
J. Henry Kaiser.
Geo. P. Smallwood.

INVENTOR.
F. W. Shelley and
Samuel Kiser
per Hallech & Hallech
atty (No Model.) 3 Sheets—Sheet 2.
F. W. SHELLEY & S. KISER.
BRICK MACHINE.
No. 291,413. Patented Jan. 1, 1884.
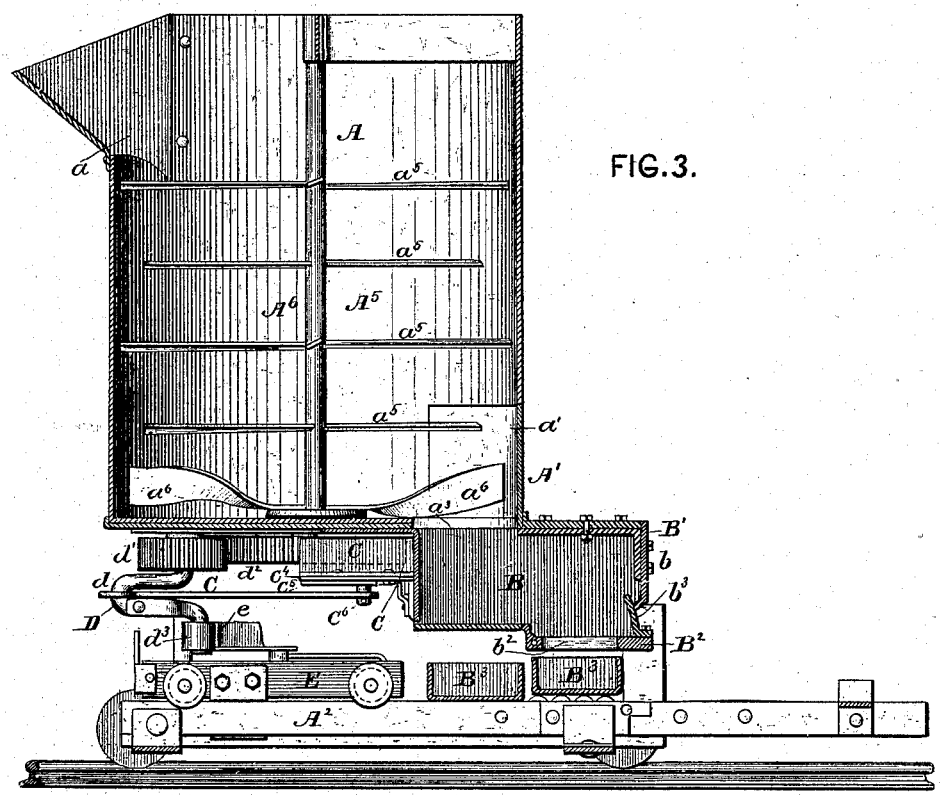
FIG. 3.
FIG. 4.
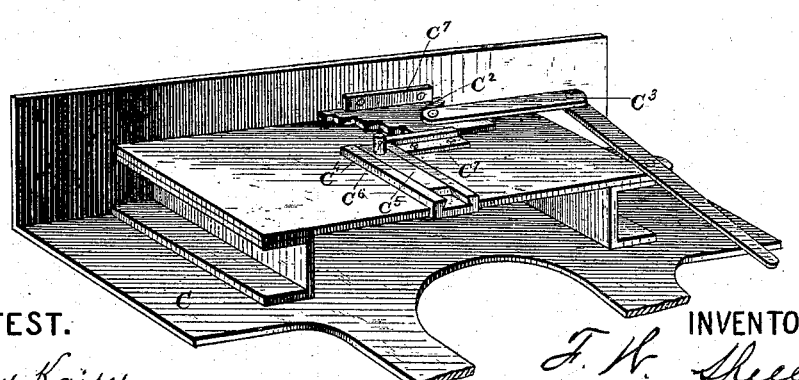
ATTEST.
J. Henry Kaiser.
Geo. T. Smallwood.
INVENTOR.
F. W. Shelley
Samuel Kiser
per Halleck & Halleck
Attys.

(No Model.) 3 Sheets—Sheet 3.

F. W. SHELLEY & S. KISER.
BRICK MACHINE.

No. 291,413. Patented Jan. 1, 1884.

ATTEST.
J. Henry Kaiser.
Geo. T. Smallwood.

INVENTOR.
F. W. Shelley
Samuel Kiser
per Halleck & Halleck
atty

UNITED STATES PATENT OFFICE.

FRANK W. SHELLEY AND SAMUEL KISER, OF ANDERSON, INDIANA.

BRICK-MACHINE.

SPECIFICATION forming part of Letters Patent No. 291,413, dated January 1, 1884.

Application filed November 15, 1883. (No model.)

*To all whom it may concern:*

Be it known that we, FRANK W. SHELLEY and SAMUEL KISER, citizens of the United States, residing at Anderson, in the county of Madison and State of Indiana, have invented certain new and useful Improvements in Brick-Machines; and we do hereby declare the following to be a full, clear, and exact description of the invention, such as will enable others skilled in the art to which it appertains to make and use the same.

Our invention relates to improvements in that class of machines which use mud for forming bricks.

The objects and nature of our invention will more fully appear from the subjoined description and claims, reference being had to the accompanying drawings, in which—

Figure 1:
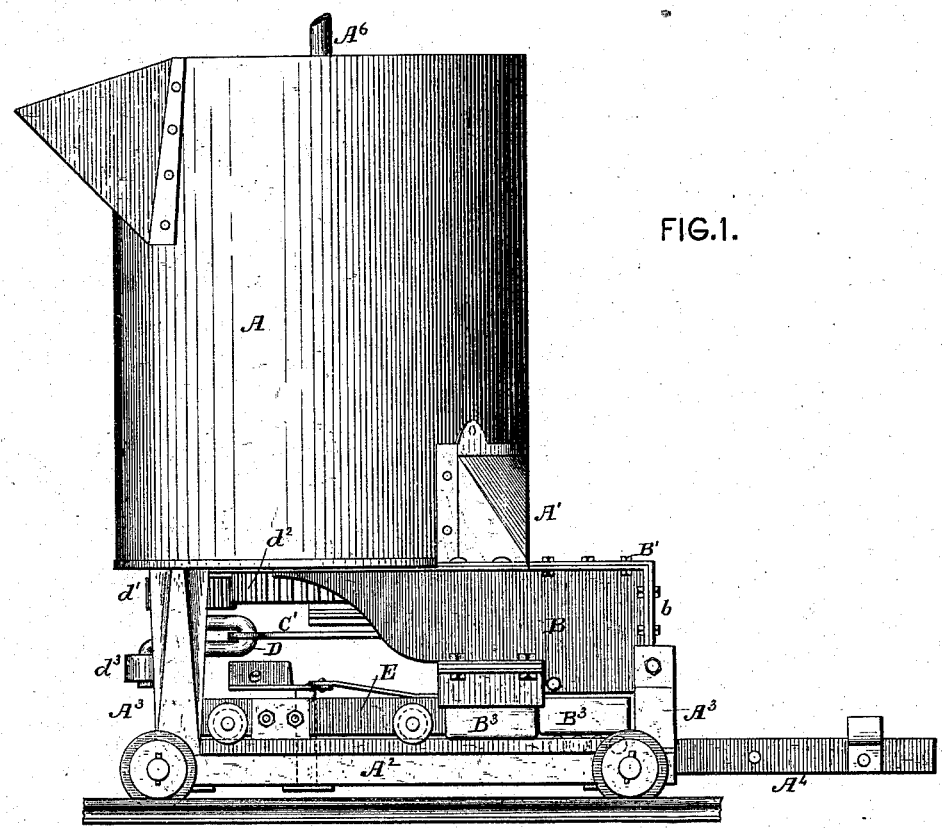
Figure 2:
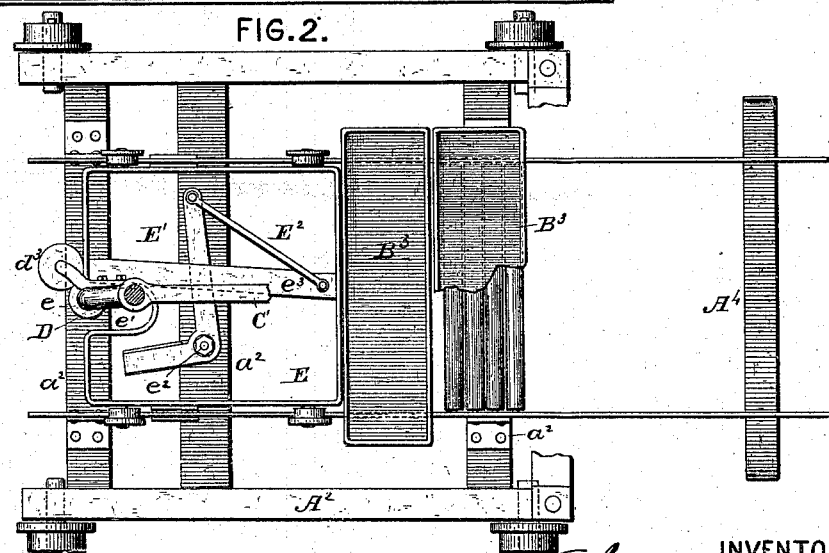
Figure 5:
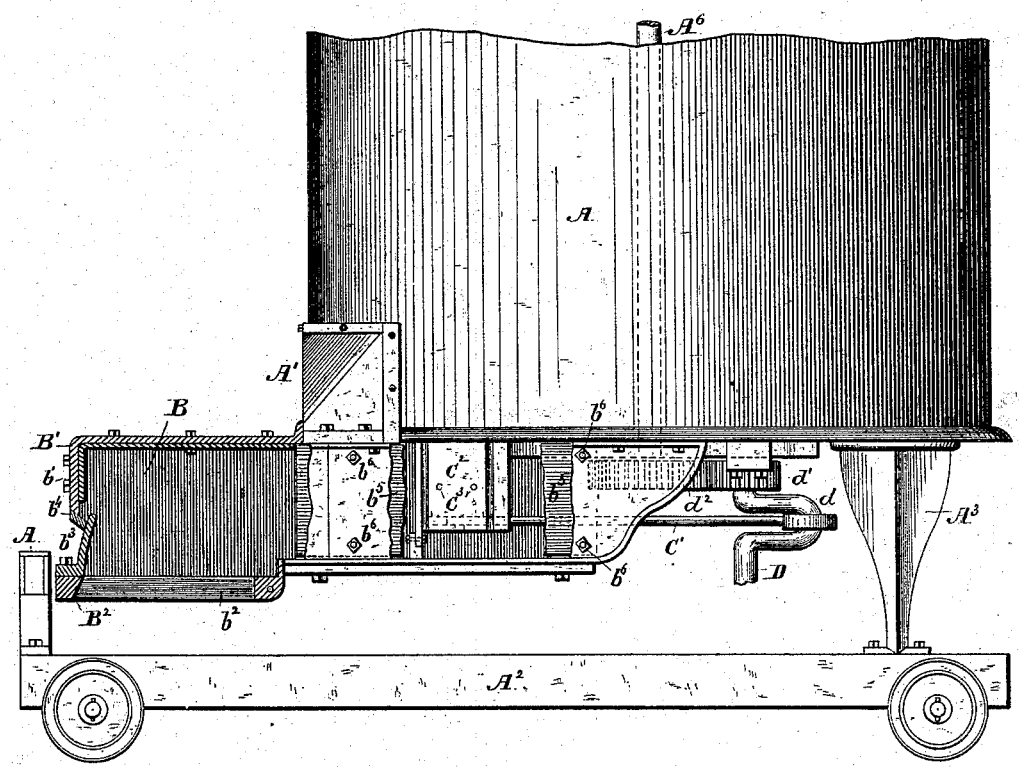
Figure 6:
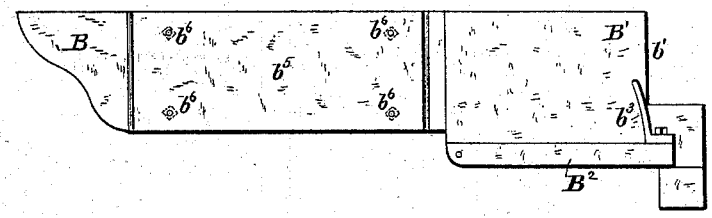
Figure 7:
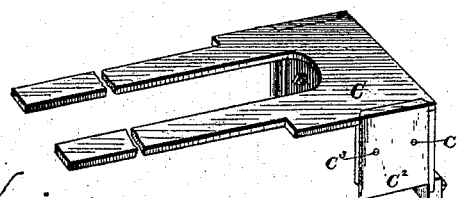

Figure 1 represents a side elevation; Fig. 2, a horizontal section on line $y\ y$, Fig. 1; Fig. 3, a vertical longitudinal section; Fig. 4, a detail in perspective, showing the parts upon the under side of the reciprocating plunger; Fig. 5, an enlarged view of part of the machine, showing the removable plates; Fig. 6, a section of the mud-box and plunger, and Fig. 7 the plunger with adjustable side plates.

A represents the mixing-drum, which is preferably made of iron, having spaces or openings $a$ and $a'$ for the spout and rectangular box A'. The drum is supported from a truck, $A^2$, by legs $A^3$. This truck is provided with cross-beams $a^2$ and a pivoted extension, $A^4$, which ordinarily is in a horizontal position, but may be turned vertically. Within the drum is an agitator or mixer, $A^5$, formed of shaft $A^6$, journaled in the drum in any suitable manner, and arms $a^5$ and $a^6$. The arms $a^6$ are broader than the arms $a^5$, and are used to scrape the material from the bottom B of the drum into the mud-box, which is connected with said drum by an opening, $a^3$, in the bottom of the latter. This opening $a^3$ is continuous with the opening $a'$, and is closed by a rectangular or nearly rectangular box, A', which is attached to the drum. This box may be curved at its top, to permit of its being attached directly to the cylindrical drum, and its lower part made rectangular, to form, with opening $a^3$, a rectangular opening, so that the mud will fall evenly into the mud-box, so that each of the molds will receive its proper proportion of mud.

Attached to the bottom of the drum in any suitable manner is a mud-box, B, which, as before stated, communicates with the interior of the drum by means of opening $a^3$. It is open at its rear end for the admission of a horizontal reciprocating plunger, C, which forces the mud toward the front of the box. The rectangular box A' closes that part of the box which extends laterally beyond the walls of the drum, and a plate, $b'$, closes the forward extension, B'. In the bottom of this extension is the die $B^2$, having openings $b^2$ for the mud to escape into the molds $B^3$, placed upon the truck. The forward end of the die is provided with a lip, $b^3$, which closes the space between the die $B^3$ and the front wall, $b'$, of extension B'. The wall $b'$ is preferably provided with an inward projection, $b^4$, in contact with the lip $b^3$, which may be curved, as shown. The die $B^3$ is pivoted at its rear end to the box B, so that when a stone or other hard object too large to pass into the molds makes its exit through the openings $b^2$ the forward end of the die will be lifted and the object carried out with the mold. The lip $b^3$ prevents the mud in the box passing out at the front end when the die is returned to its place.

Within the box B is a plunger, C, which forces the mud in the box through the openings in the die, and is provided with a plate, $c$, which closes the opening $a^3$ when the end $c'$ abuts against the extension B'. The sides of the plunger are provided with removable plates $c^2$, held in place by set-screws $c^3$, which permit of the plates being adjusted to take up the wear caused by its reciprocating movement. The sides of the box B are also provided with recesses for the removable plates $b^5$, held in place by set-screws $b^6$, by which the plates can be adjusted toward the plunger to take up the wear. The plates $c^2$ and $b^5$, in addition to taking up the wear, prevent leakage of mud from the box. If the plates $c^2$ and $b^5$ become too much worn, they can readily be removed and new plates substituted therefor. In the under side of plate $c$ is formed a dovetail groove, $c^4$, in which is placed a dovetail slide, $c^5$, having a pin, $c^6$, to which a pitman, C′, is attached, for the purpose of reciprocating the plunger C.

To regulate the stroke of the pitman, I provide a stepped plate, $C^2$, which is held in place by ways $c^7$ on the plunger, and is reciprocated by means of link and lever $C^3$. When it is desired to send the plunger forward with greater velocity or force, the step nearest the dovetail slide is forced opposite the dovetail groove $c^4$, so that the dovetail slide will strike it in its forward movement. The extent of the stroke can be regulated by using the different steps. The pitman C′ is attached to a crank, $d$, on a vertical shaft, D, which is journaled on the drum, and connected by gear $d'$ $d^2$ to the shaft $A^6$, which imparts its motion to the shaft D. Upon this shaft is a wiper, $d^3$, which moves the carriage E forward at each revolution of the shaft by wiping a stationary and upward extension, $e$, of the carriage. The wiper may be provided with a roller, which reduces the wear upon said carriage. This carriage is formed of a frame having all its parts fixed, and provided with a recess, $e'$, for the shaft D, and forms a stop for the return movement of the carriage. This movement is accomplished by means of a lever, E′, pivoted to a standard, $e^2$, attached to the truck.

Pivoted to one arm of the lever E′ is a link, $E^2$, which extends to and is pivoted upon the stationary center piece, $e^3$, of the carriage E. The opposite end of the lever is curved in such manner as to be in line with the wiper $d^3$, which, after forcing the carriage forward, strikes the free arm of the lever, and causes the opposite end to draw the link, and consequently the carriage, back into position ready for the wiper to move it forward again.

The operation of the machine is as follows: Mud is placed in the drum and stirred by the agitator to break up the lumps. The motion of the agitator is imparted to the shaft D, gear $d'$ and $d^2$, which reciprocate the plunger. The mud nearest the bottom of the drum is forced by scrapers $a^6$ through the opening $a^3$ into the mud-box, and plunger B, as it moves forward, forces the mud out of the extension into the molds, and at the same time cuts off the supply from the drum by means of plate $c$. The molds are placed beneath the mud-box, and are forced forward beneath the extension by the carriage E, which returns at a faster rate than it moves forward, to permit the operator to place the molds beneath the mud-box as fast as they are taken out from the front of the machine. The molds follow each other so rapidly that the mud does not fall between them, and mud in the mold forced out by the carriage is leveled by the die, which is weighty enough to serve this purpose.

We are aware that shafts provided with a wiper having a roller thereon are old, and that carriages have been moved by such a wiper; but we are not aware of a reciprocating carriage having a projection upon its top, combined with a lever mounted upon a standard, one end of said lever connected to said carriage by a link, and a revolving shaft having an arm which alternately strikes the projection and the free end of the lever.

We claim—

1. In a brick-machine, the combination of a mud-box having a front wall, $b^3$, and a die pivoted at its rear end, and its front end free to move vertically and provided with a lip, which abuts against the wall $b^3$, substantially as described.

2. In a brick-machine, the combination of a mud-box having recessed walls provided with adjustable side plates and a plunger, substantially as described.

3. In a brick-machine, the combination of a mud-box having recessed walls provided with adjustable side plates and a plunger having adjustable side walls, substantially as described.

4. In a brick-machine, the combination of a reciprocating carriage having a projection upon its top, a standard having a lever fulcrumed thereon, one end of said lever connected to the carriage by a link, and a revolving shaft having an arm which alternately strikes the projection of the carriage and the free end of the lever, substantially as described.

5. In a brick-machine, the combination of a mud-box and a plunger having adjustable side plates, substantially as described.

6. In a brick-machine, a drum having openings $a'$ and $a^3$, the latter in the bottom, and a substantially rectangular box closed top, and attached to the walls of the drum and closing the opening $a'$, substantially as described.

7. In a brick-machine, the combination, with a drum having openings $a'$ and $a^3$ in the bottom, and a rectangular box closing the opening $a'$, of a mud-box attached to the bottom of the drum beneath the opening formed by the rectangular box, substantially as described.

8. In a brick-machine, a drum having its interior cylindrical, and provided with a rectangular opening in its bottom for the escape of the mud, substantially as described.

9. In a brick-machine, the combination of a drum having its interior cylindrical, and provided with rectangular opening in its bottom for the escape of mud, and a mud-box attached to the bottom of the drum below the rectangular opening, substantially as described.

10. In a brick-machine, the combination of a drum having a revolving agitator, a mud-box below the drum, a plunger within the mud-box and connected to a crank-shaft by a pitman, and said crank-shaft connected to the shaft of the agitator by gear-wheels, substantially as described.

11. In a brick-machine, the combination of a groove and slide and a stepped stop held in place by ways, and adapted to be moved in front of the groove and slide, substantially as described.

12. In brick-machines, the combination of a mud-box and a die-plate pivoted at its rear end, and its front end in contact with the front wall of the box, but free to move vertically, as set forth.

In testimony whereof we affix our signatures in presence of two witnesses.

FRANK W. SHELLEY.
SAMUEL KISER.

Witnesses:
J. H. TERHUNE,
GEO. ROSS.